United States Patent [19]

Barrett et al.

[11] 4,043,422
[45] Aug. 23, 1977

[54] STEERING SYSTEM FOR ARTICULATED VEHICLES

[75] Inventors: John C. Barrett, Rogers; Gerald T. Gfroerer, New Hope, both of Minn.

[73] Assignee: Raygo, Inc., Minneapolis, Minn.

[21] Appl. No.: 743,394

[22] Filed: Nov. 19, 1976

[51] Int. Cl.² .................................................. B62D 5/08
[52] U.S. Cl. .................................... 180/140; 180/20; 180/139
[58] Field of Search ............... 180/140, 134, 135, 136, 180/137, 138, 139, 20; 404/126

[56] References Cited

U.S. PATENT DOCUMENTS

| | | | |
|---|---|---|---|
| 3,556,243 | 1/1971 | Susag | 180/140 |
| 3,856,102 | 12/1974 | Queen | 180/140 |
| 3,868,194 | 2/1975 | Ferguson | 404/126 |
| 3,947,142 | 3/1976 | Takata | 404/126 |

Primary Examiner—Joseph F. Peters, Jr.
Assistant Examiner—R. Schrecengost
Attorney, Agent, or Firm—Ira Milton Jones & Associates

[57] ABSTRACT

An electro-hydraulic steering system for vehicles such as roller type surface compacting machines which have a steerable ground-engaging unit at each end of the chassis. The system combines a conventional orbital type steering valve, two conventional solenoid actuated hydraulic valves and two conventional lock valves with an electric control circuit that includes simple console-mounted selector switches, a foot pedal-controlled switch and a simple cam-actuated switch that is automatically actuated in consequence of shifting the control lever of the vehicle's transmission from "forward" to "reverse" and vice versa, in a manner which gives the operator unprecedented flexibility in his choice of steering mode.

9 Claims, 8 Drawing Figures

STEERING SYSTEM FOR ARTICULATED VEHICLES

This invention relates broadly to the control of articulated vehicles which have a steerable ground-engaging unit at each end of the chassis, and while applicable to any such vehicle, is especially well suited to articulated pavement compacting machines such as the "RANGER," which is produced by RayGo, Inc., and covered by the Takata et al U.S. Pat. No. 3,947,142. In fact, the invention was developed especially for that machine.

Machines or vehicles of the "RANGER" type are steerable by either the leading or the trailing unit. If the vehicle is moving forward, the front unit obviously is its leading unit and, when moving rearward, it is the rear unit which leads. While that mode of steering — i.e. by the leading unit — is perhaps the most common, in some circumstances it is more advantageous and, in fact, may be imperative, that the steering be done by the trailing unit. This then is a second mode in which the progress of the vehicle must be steerable. In each of these two modes, the unit which is not being steered remains fixed in its straightaway orientation with the vehicle chassis.

The capability of steering by those two modes enables the two steerable units of the vehicle to be quickly adjusted from the more conventional tandem disposition to an echelon relationship to increase the effective width of the machine, and then steered by either its leading or its trailing unit.

But there is still at least one other mode in which vehicles and machines of the type with which this invention is concerned should be steerable. This is the crab mode. In it, both steerable units are simultaneously steered in the same direction, either to the right or the left. The crab mode of steering enables the operator to quickly move the vehicle either to the right or the left without disturbing its parallel alignment with the sides of the road. And, for complete versatility, the vehicle should also be steerable in the so-called radial mode in which both units are simultaneously steered, but in opposite directions. This latter mode enables the machine to negotiate short radius curves while maintaining a constant rolling width.

While vehicles with steerable front and rear units heretofore have been equipped with controls by which different modes of steering could be obtained, no known prior steering system has had the flexibility and versatility achieved by this invention. The closest prior art approach to the present system is that of the Ferguson et al. U.S. Pat. No. 3,868,194; but that system lacks the flexibility and ease of operation that characterizes this invention.

As in the aforesaid Takata et al patent and also the Ferguson et al patent, the front and rear units of the vehicle are steered by paired hydraulic double-acting cylinders, and — as in the latter patent — manipulation of a steering wheel acting through an orbital-type steering valve governs the flow of pressure fluid to those cylinders as required to effect the desired steering adjustment of their respective steerable units. But, in contrast to the system of the Ferguson et al. patent wherein selective coordination of the unit to be steered requires manually shifting a valve by means of splayed levers which must be manipulated in addition to other direction controlling levers every time the operator changes from forward to rearward travel and vice versa, with this invention that coordination is automatically effected as a consequence of shifting a single transmission adjusting lever.

Another advantage the present invention has over the steering system of the Ferguson et al patent is that the latter is incapable of crab mode steering. By contrast, with this invention crab mode steering is not only possible but instantaneously available by depression of a foot pedal-controlled switch. This capability enables the operator to randomly select the crab mode while performing other operations with his hands, and greatly facilitates manoeuvering the vehicle in that mode when occasion demands, while leaving the steering system conditioned for steering by either the leading or the trailing unit, as determined by a prior setting of a selector switch on the console of the machine. Hence, upon release of the foot pedal-controlled switch, steering continues in the mode determined by the setting of the selector switch.

The invention also enables the system to be conditioned for steering in the crab mode by simply actuating another console mounted switch, so that until that switch is again actuated, steering takes place in the crab mode whether the vehicle is moving forward or backward.

Finally, the invention provides the operator the option of switching from the crab mode of steering to the radial mode.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and a modification of a portion thereof, and in which:

FIGS. 2 through 7 diagrammatically illustrate the steering system of this invention, and respectively show — by means of a common set of symbols — how the system can be conditioned by the operator to enable steering in any one of the following modes:

Before referring to the drawings, it may be helpful to note that the invention broadly comprises:

A fluid pressure responsive steering system for vehicles having transmission means by which the direction of travel of the vehicle is manually selectable, and having a steerable ground-engaging unit at each end of its chassis, so that by operator-controlled, power effected steering adjustment of the steerable units with respect to one another and the chassis, the progress of the vehicle over the ground in either a forward or a rearward direction can be steered, which system comprises reversible hydraulic motor means (a single one or paired double-acting cylinders) drivingly connected with each of said steerable units, and operable to impart steering adjustment thereto; manually operable steering valve means (orbital type valve) by which the functioning of the motor means may be commanded; hydraulic circuit means having said manually operable steering valve means incorporated therein for conducting pressure fluid to the motor means from a source thereof in response to and under control of manual actuation of the steering valve means; disabling valve means for each of the motor means connected in the hydraulic circuit means, operable when in its operative condition to render its respective motor means unresponsive to fluid pressure in said hydraulic circuit means; check valve means connected in the hydraulic circuit means between each of the disabling valve means therein and its respective motor means, operable as a consequence of said disabling valve means being in its operative condition to prevent the flow of fluid to or from the motor means and thereby lock said motor means in the position to which it moved in response to its last steering command; control means operatively connected with the disabling valve means for governing the condition thereof, said control means being operatively connected with the vehicle transmission to automatically render one of said disabling valve means operative without affecting the other when the transmission is shifted to effect forward travel of the vehicle and vice versa when it is shifted into reverse, so that steering of the vehicle is effected by one of the motor means during travel of the vehicle in one direction and by the other during travel of the vehicle in the opposite direction.

Figure 1:
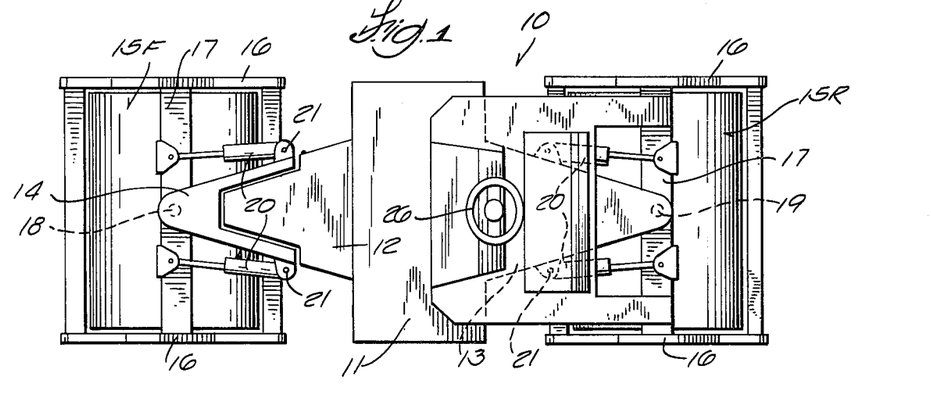
FIG. 1 is a top view of the articulated pavement compacting machine of the Takata et al patent, which machine is representative of the type of vehicle for which the steering system of this invention is especially adapted.

Now, with reference to the drawings — and first considering FIG. 1 — the numeral 10 designates the chassis of the machine chosen as illustrative of the type of vehicle with which this invention is concerned. The chassis consists of a main section 11 with forwardly and rearwardly projecting arms 12 and 13, respectively, and a front section 14 which is connected with the forwardly projecting arm for relative rocking motion about a fore and aft horizontal axis.

Substantially identical roller units 15F and 15R are respectively connected with the forwardly and rearwardly projecting arms of the chassis. Each roller unit consists of a drum rotatably mounted between the arms of a yoke 16, the cross bar 17 of which extends across the top of the drum. The cross bar of the front yoke is connected with the front chassis section 14 by a pivot 18, the axis of which is vertical and perpendicularly intersects the axis of the front drum. Similarly, the cross bar of the rear yoke is connected to the rearwardly projecting arm 13 of the chassis by a pivot 19.

As will be quite obvious, the pivots 18 and 19 provide steering axes about which the roller units can be rotated independently of one another. The roller units thus constitute the steerable ground-engaging units of the vehicle; and, to effect steering rotation of these units about their respective steering axes, a pair of double-acting hydraulic cylinders 20 connects the cross arm of each yoke with pivot points 21 fixed with respect to the chassis. Extension of one of a pair of cylinders coincident with retraction of its mate imparts the desired steering torque — and, as will be readily understood — the extension and retraction of the cylinders is effected by regulating the connection of the opposite ends of the cylinders with a source of hydraulic pressure derived from a pump, not shown in FIG. 1 but identified by the numeral 22 in the diagrammatic illustration of the steering system in FIGS. 2–6.

The system by which that regulation is effected is, of course, the concern of this invention. Through it, the operator's manipulation of selector switch means 23 mounted in the console of the vehicle, foot pedal-controlled switch means 24, a transmission control lever 25 and a steering wheel 26, is translated into steering activation of the hydraulic cylinders 20 to bring about steering of the vehicle in any of a number of different operator-selected modes. The physical location of these control instrumentalities is diagrammatically illustrated in FIG. 1.

The manner in which selective actuation of the control instrumentalities conditions the system for different modes of steering by means of the steering wheel is depicted in FIGS. 2–6. In all of these figures, the hydraulic and electric circuitry of the system is identical, but its different mode-defining conditions are identified through the application to that circuitry of the symbols displayed in the index which appears in the upper left-hand corner of each of the FIGS. 2–6.

As established by that index, the different aspects of the hydraulic circuitry are identified as "PRESSURIZED-NO FLOW", "PRESSURIZED-FLOW" and "RETURN"; and the electric circuitry as "NOT ENERGIZED" and "ENERGIZED."

With this understood, the hydraulic circuitry will now be defined. Beginning with the pressure source — i.e. the pump 22 — a line 31 which is pressurized whenever the system is in operation, leads to one port of a rotary or orbital type steering valve 32. This steering valve is operatively connected with the steering wheel 26 shown in FIG. 1 and diagrammatically indicated in FIGS. 2–6 to be actuated thereby. Another port of the steering valve is connected, through line 33, with the return or sump of the hydraulic system; and the two other ports of the steering valve are connected through lines 34 and 35 with conventional flow dividers 36 and 37. Each of the flow dividers is connected with the paired cylinders 20 at the front unit and also with the paired cylinders 20 at the rear unit. For this purpose, a line 38 leads from the flow divider 36 to the cylinders at the front unit and a line 39 leads from the flow divider 36 to the cylinders at the rear unit. Similarly, lines 40 and 41 lead from the flow divider 37 to the front and rear cylinders.

An important aspect of the hydraulic circuit is the provision of a pair of solenoid actuated normally closed shunt valves 42F and 42R, the former arranged to connect the lines 38 and 40 that lead to the front unit cylinders when it is opened by energization of its solenoid, and the latter to connect the lines 39 and 41 that lead to the rear unit cylinders when it is opened by energization of its solenoid. In each instance, the opening of the valve shunts out and prevents flow of pressure fluid to its associated paired steering cylinders 20.

It is also important to note that ahead of each pair of steering cylinders, the hydraulic circuit has a lock valve — 43F for the front unit and 43R for the rear unit. These lock valves are conventional pilot pressure controlled check valves that prevent fluid flow into or out of the steering cylinders when their respective shunt valves are open, and thus hold the unit which is not being steered in whatever position it was moved by its last steering command. In this connection it should be noted that before the operator switches steering from one unit to the other, he should restore the unit with which he had been steering to its neutral position. In the compacting machine of the aforesaid Takata et al patent, that poses no problem, since both front and rear steerable units are readily observable from the operator's position; and where such visibility is not characteristic of the machine, position indicators such as those employed in the machine of the Ferguson et al patent can be provided.

Before leaving this discussion of the hydraulic circuit, it might be well to note that adjustment of the orbital-type steering valve in response to rotation of the steering wheel to the right results in the line 34 being pressurized, and that adjustment beyond neutral in response to leftward rotation of the steering wheel, pressurizes the line 35. In each of the system conditions depicted by FIGS. 2-6, the steering valve is assumed to have been adjusted by rotation of the steering wheel to the right.

Except for the steering wheel-controlled orbital type valve — no component of the hydraulic circuit is manually actuated. Instead, that function is performed by the electric control circuit of the system in response to selective actuation of the selector switch means 23, the foot pedal-controlled switch 24 and a cam operated switch 44 that is automatically actuated in consequence of shifting of the vehicle's transmission by the lever 25.

Figure 7:
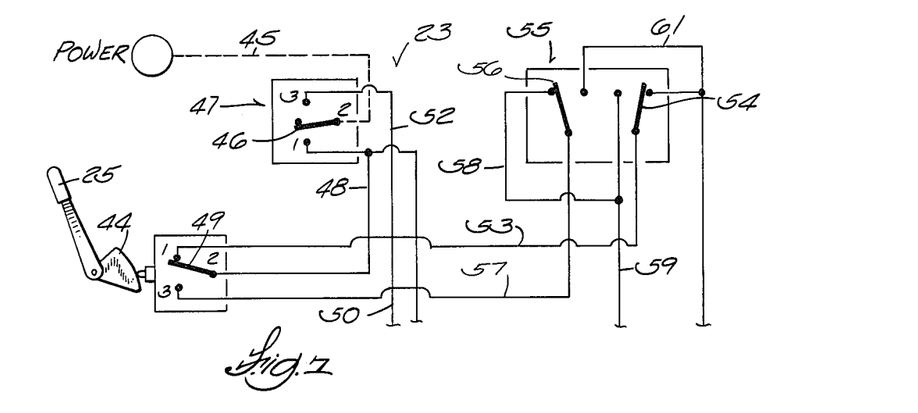
(FIG. 7): Crab mode of steering at all times.

The electric control circuit begins with a conductor 45 that connects the movable contactor 46 of a three-position one-pole switch 47 with the electric power source of the vehicle. This switch, which may be a toggle switch or any other suitable variety, is part of the console-mounted switch means 23, and as will appear hereinafter, enables the operator to cut the foot pedal-controlled switch 24 out of the circuit. As shown in FIG. 7, it also enables the operator to condition the system for only crab mode steering. For that purpose, the contactor of the switch 47 is moved to its center position in which the power to the control circuit is cut off.

Continuing with a description of the electric control circuit, a conductor 48 connects the No. 1 contact of the switch 47 with the contactor 49 of the cam-operated switch 44, and a conductor 50 connects that same No. 1 contact with the contactor 51 of the foot pedal-controlled switch 24.

A conductor 52 connects the No. 3 contact of the switch 47 with the No. 1 contact of the foot pedal-controlled switch, which in the normal condition of that switch — i.e. not depressed — is engaged by its contactor 51.

Figure 2:
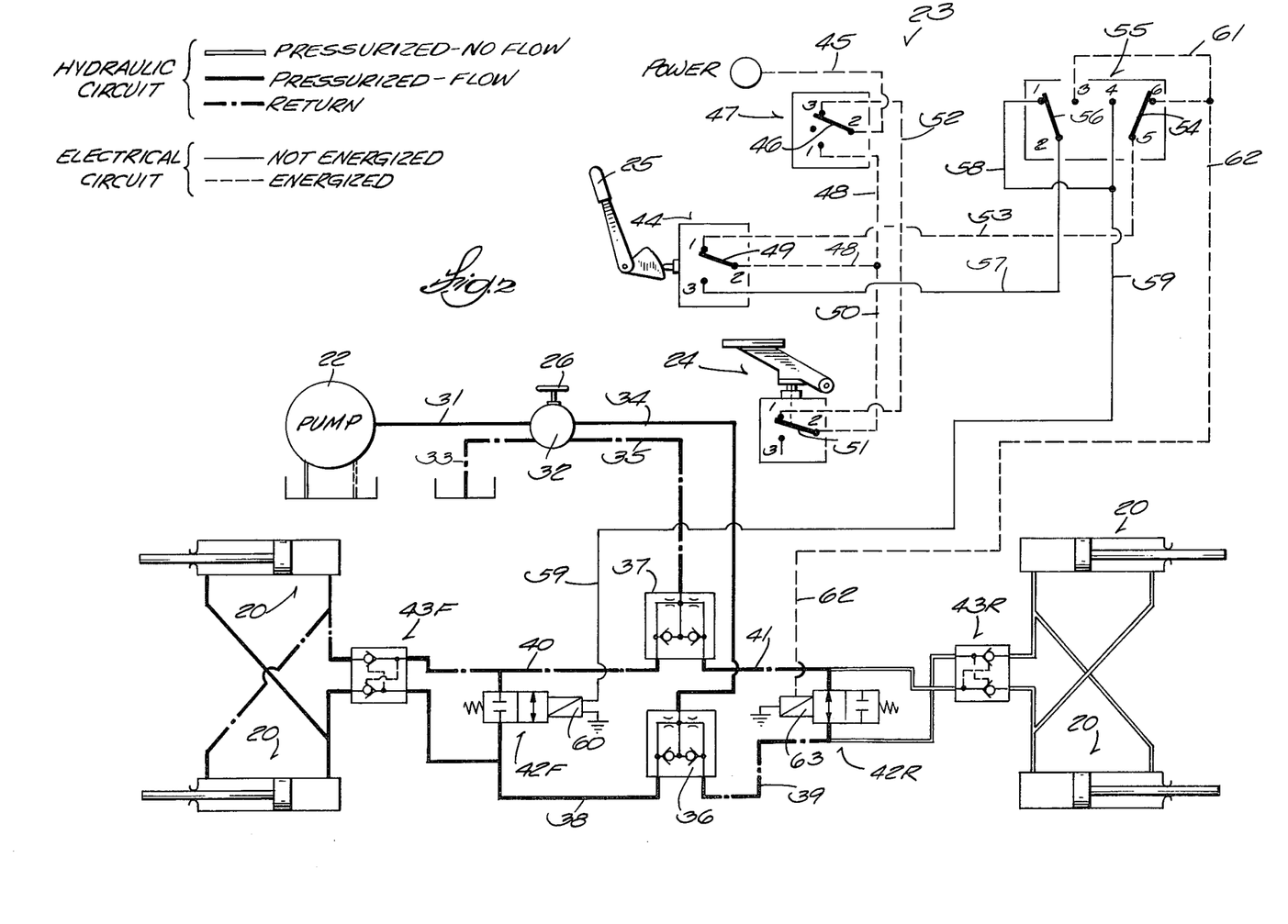
(FIG. 2): Forward travel, steering by only the leading unit.
Figure 3:
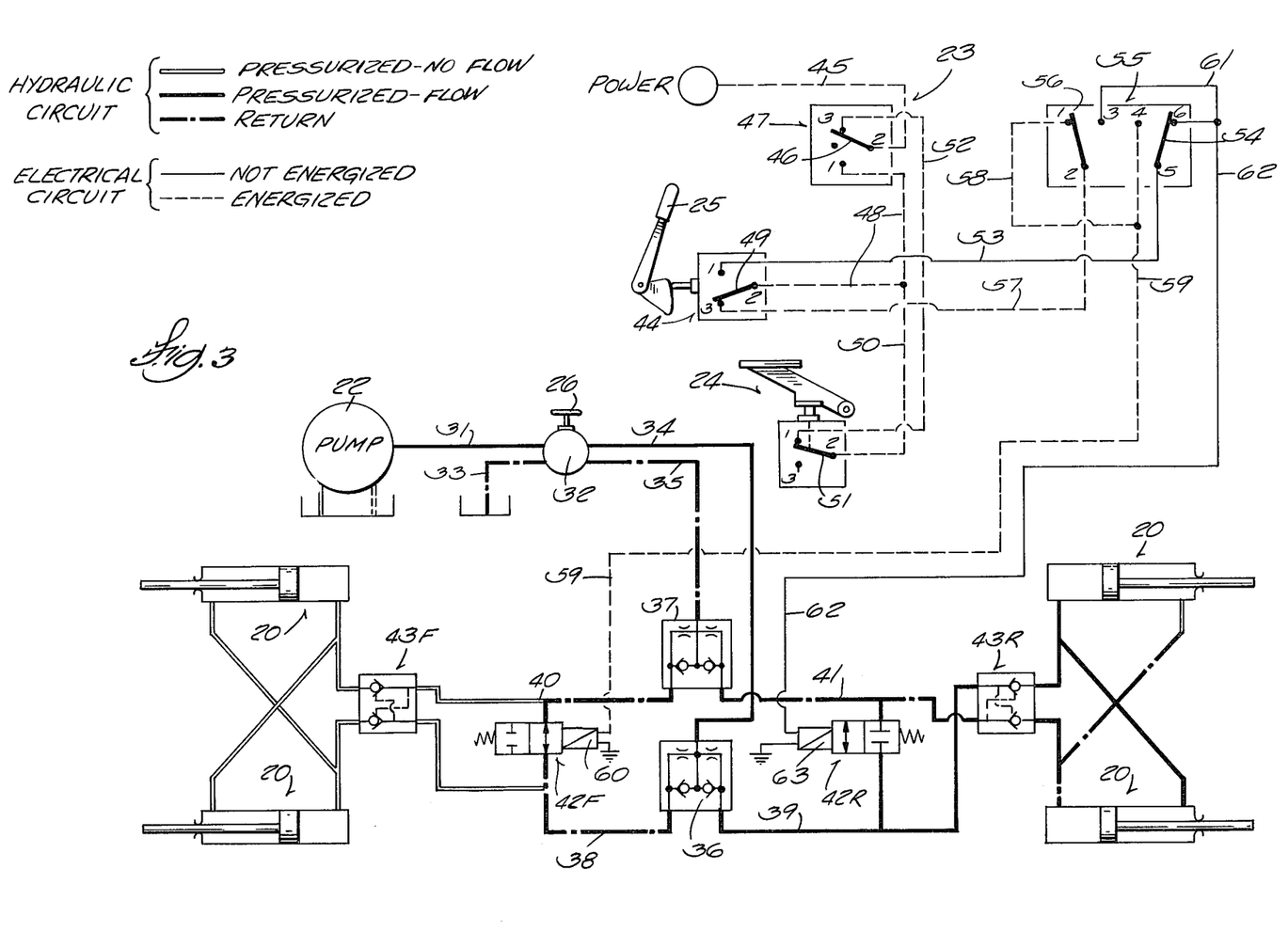
(FIG. 3): Rearward travel, steering by only the leading unit.
Figure 4:
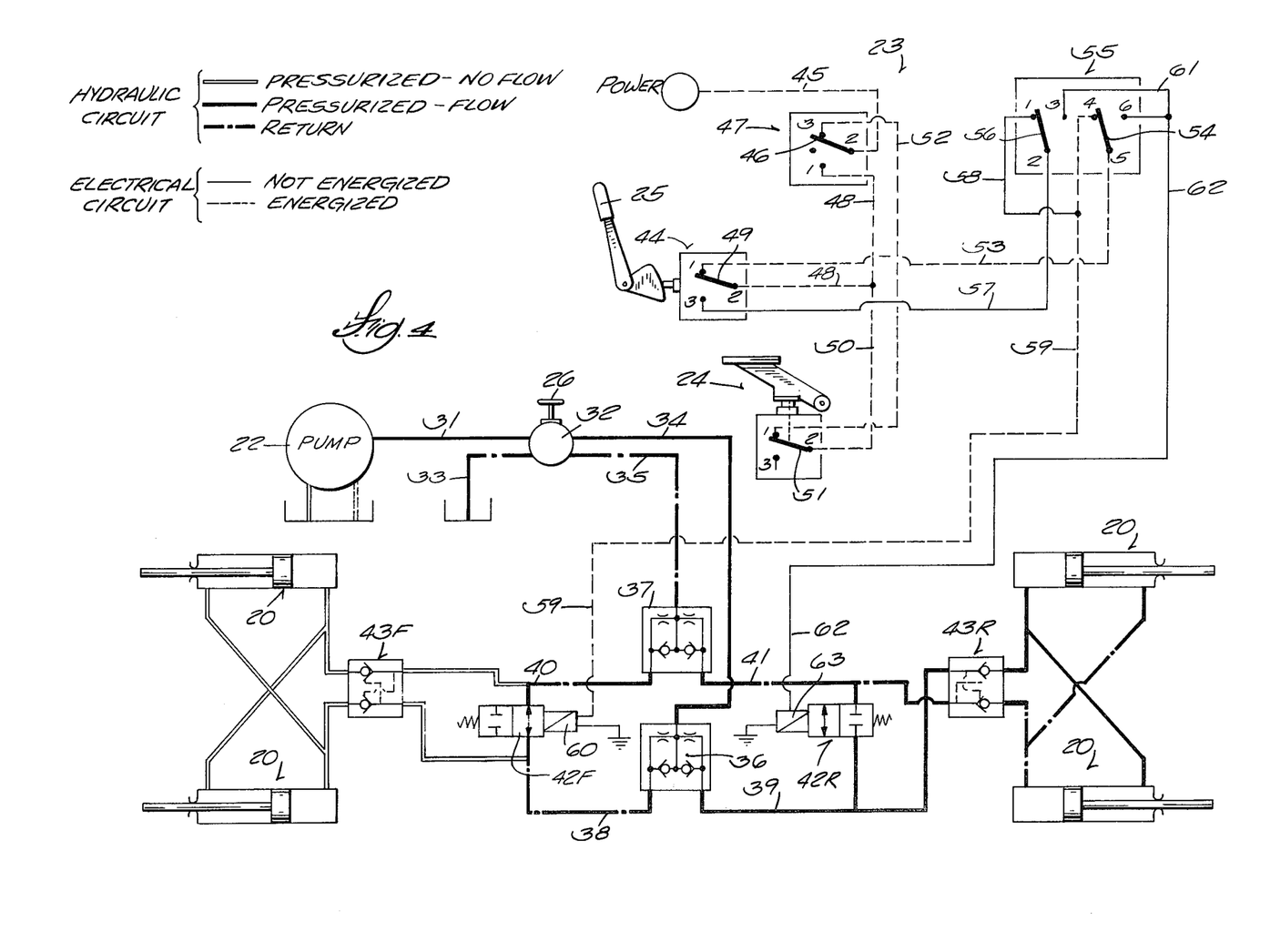
(FIG. 4): Forward travel, steering by only the trailing unit.

The contactor 49 of the cam operated switch 44 is biased to the location it occupies when the shift lever is in its "forward" position, in which it is shown in FIGS. 2 and 4-7. In that position, the contactor 49 engages that No. 1 stationary contact of the switch 44 from which a conductor 53 leads to a contactor 54 of a two-pole switch 55 that also forms part of the console-mounted selector switch means and may be of the toggle type or any other suitable variety. With the contactor 49 of the switch 44 as shown in FIGS. 2, 4 and 7, the contactor 54 is "hot"; and with the contactor 49 in the position shown in FIG. 3 (to which it is moved by actuation of the shift lever 25 to its "reverse" position), the other contactor 56 of the switch 55 is "hot" by virtue of its connection via a conductor 57 with the No. 3 contact of the switch 44.

To complete the electric circuitry, connected conductors 58 and 59 connect the No. 1 and No. 4 contacts of the switch 55 with the ungrounded side of the solenoid 60 of the shunt valve 42F; and connected conductors 61 and 62 connect the No. 3 and No. 6 contacts of the switch 55 with the ungrounded side of the solenoid 63 of the shunt valve 42R.

Figure 6:
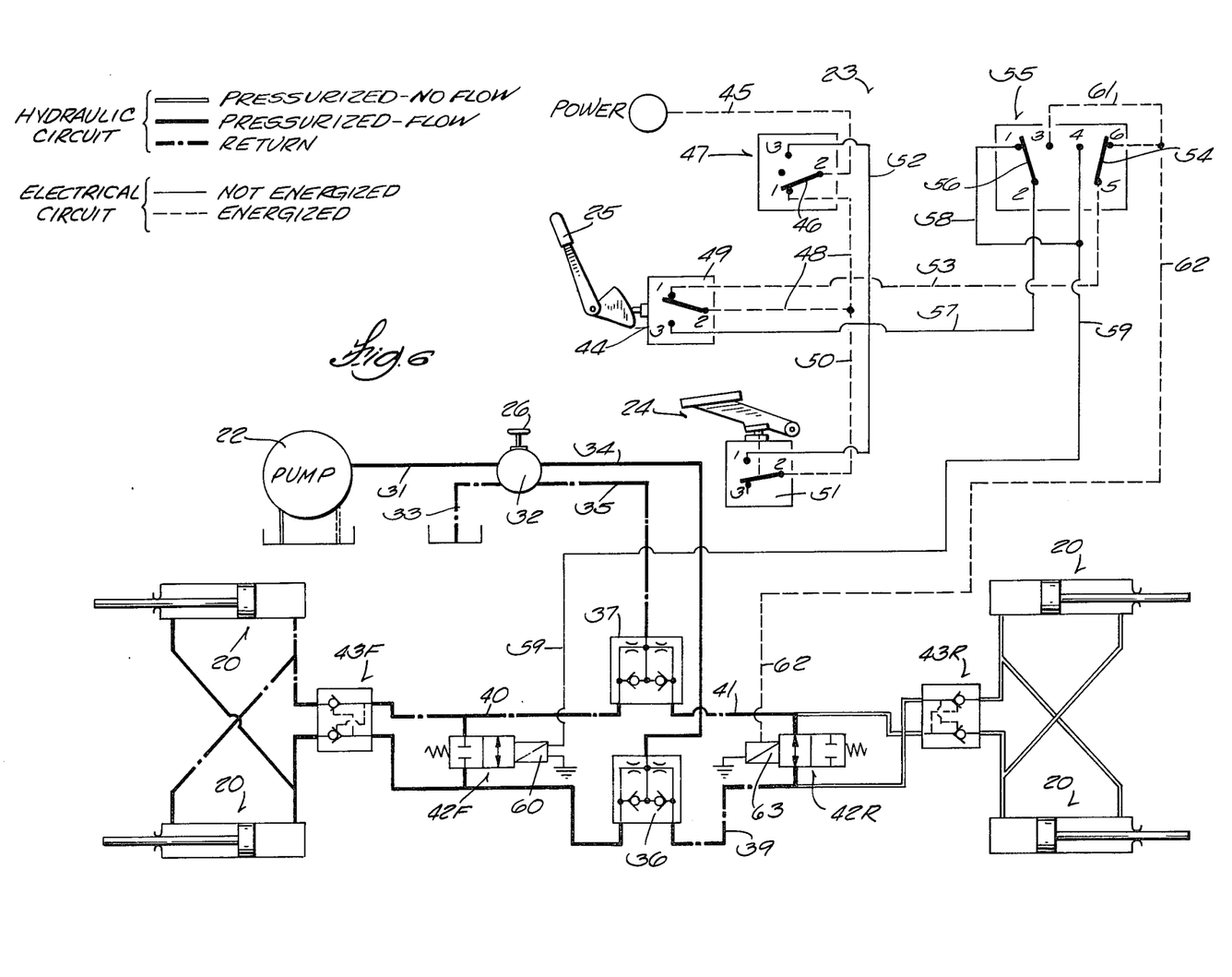
(FIG. 6): Forward travel, with the foot pedal-controlled switch immobilized and steering by the leading unit.

It follows, therefore, that with the contactor 54 of the switch 55 "hot," by virtue of the direction shifting lever 25 being in its "forward" position, and the switch 55 being in the position shown in FIGS. 2 and 6 wherein its contactor 54 engages the No. 6 contact and its contactor 56 engages the No. 1 contact, the solenoid of the shunt valve 42R will be energized to open that valve. As a result of the opening of that valve, the cylinders 20 of the rear unit will be shunted out of the circuit and locked in the position to which they were last brought — which, as noted hereinbefore — should secure the rear unit in its straightaway orientation with respect to the chassis.

The system is then conditioned for steering by the front unit during forward travel of the vehicle, which of course is then the leading unit. If now the operator moves the shift lever 25 to its "reverse" position, as shown in FIG. 3, to cause the vehicle to travel rearward, the consequent response of the switch 44 brings its contactor 49 into engagement with its No. 2 contact, makes the contactor 56 of the switch 55 "hot," and brings about the change in condition of the system depicted in FIG. 3. Here the front unit is immobilized and steering is done with the rear unit, which now is the leading unit.

Attention is directed to the fact that this transfer from steering by the front unit to steering by the rear unit (in each case, the leading unit), was effected automatically as a consequence of moving the direction-controlling shift lever 25 from one position to the other.

To condition the system for steering with the trailing unit, as depicted in FIG. 4, the console mounted switch 55 is actuated to connect its contactor 56 with its No. 3 contact and its contactor 54 with the No. 4 contact. Thereupon, steering commands emanating from the orbital-type steering valve will be effective upon the rear unit during forward travel of the vehicle and upon the front unit during rearward travel (in each instance, the trailing unit) and, as before, the change from one unit to the other is effected automatically in response to changing the position of the direction-selecting lever 25.

Assuming now that the operator suddenly wishes to steer in the crab mode. He can do this without touching either of the switches on the console, and whether he is traveling forward or rearward, or steering in the leading or trailing mode, by simply depressing the foot pedal that controls the switch 24. That operation opens the switch 24 and since this switch is in series with the connection between the contactor 49 of the cam actuated switch 44 and the contactors 54 and 56 of the switch 55, its opening cuts off current to whichever shunt valve solenoid was energized and thereby subjects both steerable units to the steering commands of the operator effected through the orbital valve 32.

Figure 5:
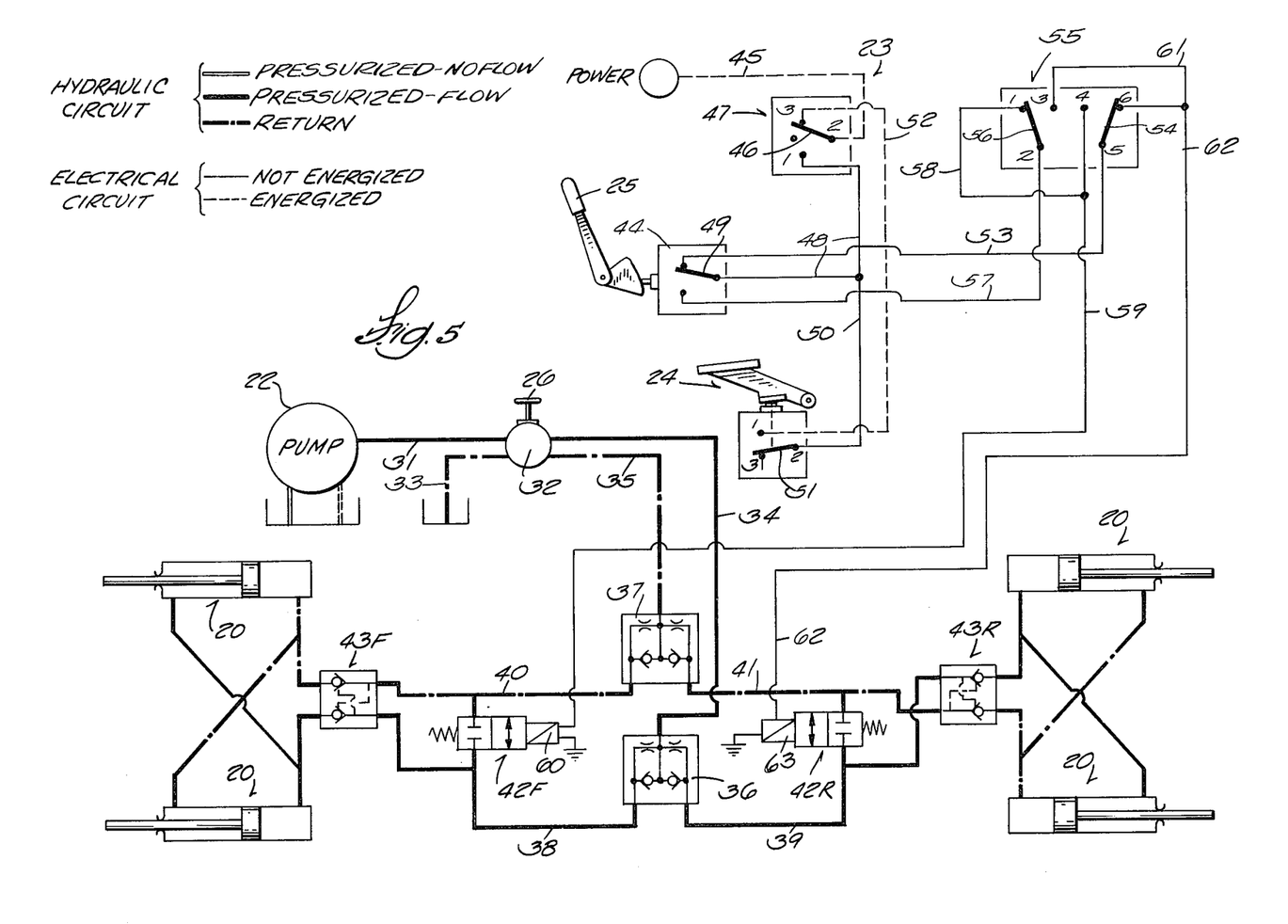
(FIG. 5): Forward travel, steering in the crab mode as a result of the foot pedal-controlled switch being actuated.

While FIG. 5 shows the contactor of the cam actuated switch 44 in the position it occupies when the vehicle is traveling forward, the situation would be the same with that contactor in its other position and the vehicle traveling rearward.

If the operator wishes to guard against accidentally placing the system in the crab mode, all that is required is to move the contactor 46 of the switch 47 into engagement with its contact 1, which is the "off" position of the switch shown in FIG. 6. This short circuits the foot pedal-controlled switch 24 and leaves the circuit responsive to the direction selecting lever 25, so that steering is automatically effected in either the "leading unit" mode or the "trailing unit" mode, depending upon the position of the mode selector switch 55.

If, instead of transient periods of operation in the crab mode, the operator wishes to condition the system for continuous operation in that mode, he can attain that objective by moving the contactor 46 of the switch 47 to its center position (disengaged from its No. 1 and No. 2 contacts) as shown in FIG. 7. This, of course, disconnects the entire electrical control circuit from the power source so that both steerable units respond at all times, and in the same direction, to the operator's commands.

Figure 8:
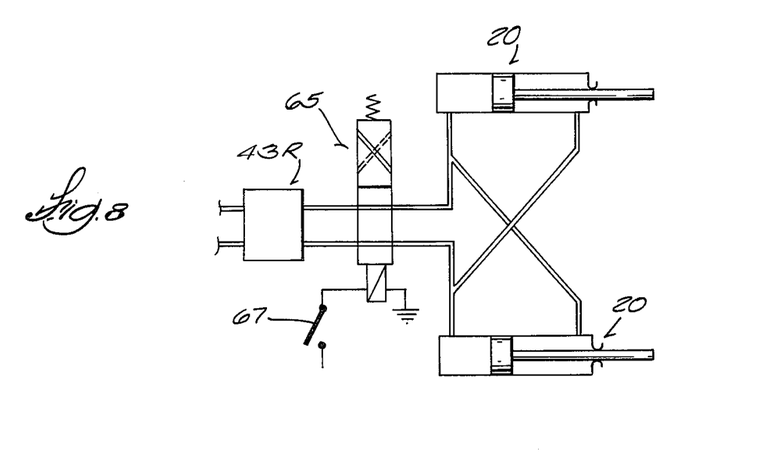
FIG. 8 illustrates, as a modified embodiment of the invention, the incorporation into the system of means for optionally converting the crab mode of steering into the radial mode, wherein both units respond simultaneously to a steering command, but in opposite directions.

Finally, as shown in FIG. 8, the operator is given the option of steering in the radial mode by the addition of a solenoid-controlled two-position valve 65 between the cylinders 20 of one of the steerable units and its respective lock valve 43F or 43R, and a control switch 67 by which energization of the solenoid of that valve is effected.

Those skilled in the art will appreciate that the invention can be embodied in forms other than as herein disclosed for purposes of illustration.

The invention is defined by the following claims:

We claim:

1. A fluid pressure responsive steering system for vehicles having transmission means by which the direction of travel of the vehicle is manually selectable, and having a steerable ground-engaging unit at each end of its chassis, so that by operator-controlled, power effected steering adjustment of said steerable units with respect to one another and the chassis, the progress of the vehicle over the ground in either a forward or a rearward direction can be steered, said system comprising:
    A. reversible hydraulic motor means drivingly connected with each of said steerable units, operable to impart steering adjustment thereto;
    B. manually operable steering valve means by which the functioning of said motor means may be commanded;
    C. hydraulic circuit means having said manually operably steering valve means incorporated therein, for conducting pressure fluid to said motor means from a source thereof in response to and under control of manual actuation of said steering valve means;
    D. disabling valve means for each of said motor means connected in said hydraulic circuit means, operable when in its operative condition to render its respective motor means unresponsive to fluid pressure in said hydraulic circuit means;
    E. check valve means connected in said hydraulic circuit means between each of the disabling valve means therein and its respective motor means, operable as a consequence of said disabling valve means being in its operative condition to prevent the flow of fluid to or from the motor means and thereby lock said motor means in the position to which it moved in response to its last steering command; and
    F. control means operatively connected with said disabling valve means for governing the condition thereof,
    said control means being operatively connected with the vehicle transmission to automatically render one of said disabling valve means operative without affecting the other when the transmission is shifted to effect forward travel of the vehicle and vice versa when it is shifted into reverse, so that steering of the vehicle is effected by one of said motor means during travel of the vehicle in one direction and by the other of said motor means during travel of the vehicle in the opposite direction.

2. The fluid pressure responsive steering system of claim 1, wherein said control means (of paragraph F) comprises electrical circuit means, and its connection with the vehicle transmission comprises
    a two-position switch, and motion imparting means connected with the transmission operable to effect movement of said switch from one position to the other as the transmission is shifted.

3. The fluid pressure responsive steering system of claim 2, further characterized in that
    said electrical circuit means also includes manually operable selector switch means by which the operator is given the choice of steering in either of two modes, in one of which steering is done with the leading steerable unit and in the other of which it is done with the trailing steerable unit.

4. The fluid pressure responsive steering system of claim 3, wherein said manually operable selector switch means is operatively connected with the transmission means of the vehicle and has at least two positions, in one of which it conditions the system to effect steering of the vehicle in one of said two modes, and in the other position thereof it conditions the system for steering in the other of said two modes,
    and in each of which positions it is so coordinated with the transmission means that selection between said two modes of steering can be made without regard for the direction in which the vehicle is traveling.

5. The fluid pressure responsive steering system of claim 4, further characterized by
    other manually operable switch means so connected in said electrical circuit means that upon actuation thereof to a selected position, the system is conditioned to disregard said selector switch means and render both of said steerable units simultaneously responsive in the same direction to the direction controlling commands of said manually operable steering valve means, to thereby enable the operator to effect crab mode movement of the vehicle either to the right or the left.

6. The fluid pressure responsive steering system of claim 5, further characterized by
    a foot pedal-controlled switch connectable into the electrical circuit means by actuation of said other manually operable switch means to another position thereof, and by which, when so connected, depression of said foot pedal-controlled switch changes the mode of steering from either of said two modes to the crab mode.

7. The fluid pressure responsive steering system of claim 1, wherein each of said reversible hydraulic motor means comprises at least one double-acting cylinder with a pair of hydraulic lines that constitute part of said hydraulic circuit means leading to it, and wherein each of said disabling valve means comprises a shunt valve connected across the paired hydraulic lines leading to its respective double-acting cylinder, so that when open each shunt valve forms a hydraulic shunt path around its respective cylinder.

8. The fluid pressure responsive steering system of claim 4, wherein each of said reversible hydraulic motor means comprises at least one double acting cylinder with a pair of hydraulic lines that constitute part of said hydraulic circuit means leading to it, and wherein each of said disabling valve means comprises a solenoid-actuatable shunt valve connected across the paired hydraulic lines leading to its respective double-acting cylinder, said shunt valve being opened by energization of its solenoid to form a hydraulic shunt path around its respective cylinder, and wherein said manually operable selector switch means achieves its coordinating function by selecting which of the shunt valve solenoids is energizable.

9. The fluid pressure responsive steering system of claim 5, wherein each of said reversible hydraulic motor means comprises at least one double-acint cylinder with a pair of hydraulic lines that constitute part of said hydraulic circuit means leading to it, and further characterized by:

A. a two-position crossover valve means connected with the paired hydraulic lines leading to said at least one double-acting cylinder of one of the reversible hydraulic motor means, said crossover valve means in one position thereof causing its associated double-acting hydraulic cylinder when activated to steer its respective steerable unit in one direction and vice versa when in its other position, said crossover valve means being biased to one of its two positions;

B. solenoid means to move said crossover valve means to its other position; and

C. means including a manually operable switch for connecting said solenoid means with a source of current, so that with the system conditioned for steering in the crab-mode, closure of said switch converts the system from steering in the crab mode to steering in the radial mode.

* * * * *